United States Patent [19]
Wornell et al.

[11] Patent Number: 5,285,478
[45] Date of Patent: Feb. 8, 1994

[54] COMMUNICATION SYSTEM UTILIZING SELF-SIMILAR SIGNALS

[75] Inventors: Gregory W. Wornell, Brookline; Alan V. Oppenheim, Lexington, both of Mass.

[73] Assignee: Massachusetts Institute of Technology, Cambridge, Mass.

[21] Appl. No.: 786,003

[22] Filed: Oct. 31, 1991

[51] Int. Cl.$^5$ .......................................... H04L 27/00
[52] U.S. Cl. .................................... 375/37; 375/121
[58] Field of Search ................. 375/38, 40, 58, 59, 375/99, 100, 122, 37, 121; 455/33, 50, 52, 54, 59, 101; 370/19, 20, 21, 69.1, 118

[56] References Cited

U.S. PATENT DOCUMENTS

| | | | |
|---|---|---|---|
| 4,142,155 | 2/1979 | Adachi | 375/38 |
| 4,206,320 | 6/1980 | Keasler et al. | 375/38 |
| 4,601,046 | 7/1986 | Halpern et al. | 375/100 |
| 4,641,318 | 2/1987 | Addeo | 375/40 |
| 4,802,190 | 1/1989 | Schouhamer Immink | 375/122 |
| 4,941,193 | 7/1990 | Barnsley et al. | 382/56 |

OTHER PUBLICATIONS

John A. C. Bingham, "Multicarrier Modulation for Data Transmission: An Idea Whose Time Has Come", May, 1990, IEEE Communications Magazine, pp. 5–14.

Primary Examiner—Stephen Chin
Attorney, Agent, or Firm—Wolf, Greenfield & Sacks

[57] ABSTRACT

A communication system is provided in which a transmitter performs modulation upon a number sequence to be transmitted. The modulation scheme includes embedding a sequence of numbers into a waveform such that the sequence is present in the waveform on multiple time scales. The transmitted waveform has a selected number of different frequency bands of successively doubling bandwidths. Each of the frequency bands includes the sequence of numbers, repeated therein at a certain rate. The rate is directly proportional to the bandwidth of the frequency band. The communication system further includes a receiver designed to average the value of the repeated sequence as received by the receiver. This scheme allows for accurate communication over noisy, uncertain, and/or hostile channels in both point to point and broadcast communication applications.

22 Claims, 10 Drawing Sheets

Table 1. The coefficients $h_N(n)$ $(n=0,\ldots,2N-1)$ for $N=2, 3,\ldots,10$

| | n | $h_N(n)$ | | n | $h_N(n)$ |
|---|---|---|---|---|---|
| $N = 2$ | 0 | .482962913145 | $N = 8$ | 0 | .054415842243 |
| | 1 | .836516303738 | | 1 | .312871590914 |
| | 2 | .224143868042 | | 2 | .675630736397 |
| | 3 | -.129409522551 | | 3 | .585354683654 |
| $N = 3$ | 0 | .332670552950 | | 4 | -.015829105256 |
| | 1 | .806891509311 | | 5 | -.284015542962 |
| | 2 | .459877502118 | | 6 | .000472484574 |
| | 3 | -.135011020010 | | 7 | .128747426620 |
| | 4 | -.085441273882 | | 8 | -.017369301002 |
| | 5 | .035226291882 | | 9 | -.044088253931 |
| $N = 4$ | 0 | .230377813309 | | 10 | .013981027917 |
| | 1 | .714846570553 | | 11 | .008746094047 |
| | 2 | .630880767930 | | 12 | -.004870352993 |
| | 3 | -.027983764917 | | 13 | -.000391740373 |
| | 4 | -.187034811719 | | 14 | .000675449406 |
| | 5 | .030841381836 | | 15 | -.000117476784 |
| | 6 | .032883011667 | $N = 9$ | 0 | .038077947364 |
| | 7 | -.010597401785 | | 1 | .243834674613 |
| $N = 5$ | 0 | .160102397974 | | 2 | .604823123690 |
| | 1 | .603829269797 | | 3 | .657288078051 |
| | 2 | .724308528438 | | 4 | .133197385825 |
| | 3 | .138428145901 | | 5 | -.293273783279 |
| | 4 | -.242294887066 | | 6 | -.096840783223 |
| | 5 | -.032244869585 | | 7 | .148540749338 |
| | 6 | .077571493840 | | 8 | .030725681479 |
| | 7 | -.006241490213 | | 9 | -.067632829061 |
| | 8 | -.012580751999 | | 10 | .000250947115 |
| | 9 | .003335725285 | | 11 | .022361662124 |
| $N = 6$ | 0 | .111540743350 | | 12 | -.004723204758 |
| | 1 | .494623890398 | | 13 | -.004281503682 |
| | 2 | .751133908021 | | 14 | .001847646883 |
| | 3 | .315250351709 | | 15 | .000230385764 |
| | 4 | -.226264693965 | | 16 | -.000251963189 |
| | 5 | -.129766867567 | | 17 | .000039347320 |
| | 6 | .097501605587 | $N = 10$ | 0 | .026670057901 |
| | 7 | .027522865530 | | 1 | .188176800078 |
| | 8 | -.031582039318 | | 2 | .527201188932 |
| | 9 | .000553842201 | | 3 | .688459039454 |
| | 10 | .004777257511 | | 4 | .281172343661 |
| | 11 | -.001077301085 | | 5 | -.249846424327 |
| $N = 7$ | 0 | .077852054085 | | 6 | -.195946274377 |
| | 1 | .396539319482 | | 7 | .127369340336 |
| | 2 | .729132090846 | | 8 | .093057364604 |
| | 3 | .469782287405 | | 9 | -.071394147166 |
| | 4 | -.143906003929 | | 10 | -.029457536822 |
| | 5 | -.224036184994 | | 11 | .033212674059 |
| | 6 | .071309219267 | | 12 | .003606553567 |
| | 7 | .080612609151 | | 13 | -.010733175483 |
| | 8 | -.038029936935 | | 14 | .001395351747 |
| | 9 | -.016574541631 | | 15 | .001992405295 |
| | 10 | .012550998556 | | 16 | -.000685856695 |
| | 11 | .000429577973 | | 17 | -.000116466855 |
| | 12 | -.001801640704 | | 18 | .000093588670 |
| | 13 | .000353713800 | | 19 | -.000013264203 |

FIG.6

COMMUNICATION SYSTEM UTILIZING SELF-SIMILAR SIGNALS

GOVERNMENT RIGHTS

This patent application concerns an invention in connection with which two agencies of the U.S. Government have provided grants which may provide government rights in the invention. The U.S. Air Force Office of Sponsored Research (AFOSR) has provided support under Contract Grant No. AFOSR-91-0034 and the Defense Advanced Research Project Administration (DARPA), has provided support under Contract Grant No. N00014-89-J-1489.

FIELD OF THE INVENTION

The present invention relates to a communication system for transmitting and receiving information, and more specifically to a communication system in which the information is modulated into a transmitted waveform exhibiting self-similarity over a selected wide range of time and frequency bands, thereby enabling effective communication for numerous applications.

BACKGROUND OF THE INVENTION

In the field of communications, it is desirable to send a message from a transmission point, through a channel, and to receive such message at one or more destination points. The message may consist of certain information in the form of discrete numbers, continuous analog waveforms, or the like. Consequently, the message may be as diverse as a digital data transmission between computers or a television broadcast. The channel includes the medium through which the message is sent. A typical channel is the atmosphere, such as in a radio broadcast communication scenario, for example. It has become general practice in the communication field to modulate the information to be sent into a continuous waveform which will be transmitted over the channel. The channel, due to natural phenomena, will alter the continuous waveform in some respects such as adding noise and/or fading in certain frequency ranges and time intervals. In addition, in hostile environments, the waveform may be intercepted or subjected to man-made interference in certain frequency ranges and/or time intervals. As such, recovery of the information transmitted becomes problematic. Moreover, many current communication schemes employ compression techniques for compressing the information to be transmitted, in an effort to save time or reduce bandwidth requirements, which, in turn, increases the possibility of error in recovery.

As illustrated in FIG. 1, the classical configuration for such a communication system involves a modulator 10 at the transmitter, for embedding the data sequence q[n] into a signal x(t) which is transmitted over the channel 12. The data sequence q[n] is the information to be communicated. The channel 12 alters the transmitted signal x(t), producing the distorted signal r(t). At the receiver, a demodulator 14 processes the distorted signal r(t) to extract an optimal estimate $\hat{q}[n]$ of the data sequence q[n].

Typically, the channel 12 would be open for some time interval T during which it has a particular bandwidth W and signal-to-noise ratio (hereinafter "SNR"). This rather generic model of the channel 12, as illustrated in FIG. 2, can be used to describe both characteristics of the transmission medium, and constraints inherent in one or more receivers, for a multiple receiver application. As illustrated in FIG. 2, z(t) represents the noise which is added by the channel to the transmitted signal x(t). In short, the transmitted signal x(t) is affected by channel bandwidth constraints (indicated by the filter B(w)) and duration constraints (indicated by switch 15), noise characteristics, and receiver processing limitations (which may typically be lumped into the function B(w) and switch 15) in certain applications.

When either the bandwidth or duration parameters or properties of a channel are known before transmission, many well-established approaches for transmitting and receiving information (q[n]) reliably, exist. In a wide range of applications, however, both the bandwidth and duration parameters are either unknown or at least inaccessible to the transmitter. As such, with present communication systems, in such applications, communication may become unreliable at times and accurate communication unattainable.

Such applications, in which both the bandwidth and duration parameters are either unknown or at least inaccessible to the transmitter, encompass both point-to-point and broadcast communication scenarios, and include the following:

1. Broadcast communication involving multiple receivers of unknown or differing processing capabilities;
2. Communication involving channels subject to hostile jamming and other interception attempts;
3. Communication involving multiple access channels;
4. Communication involving fading channels; and
5. Covert communication involving desired low probability of intercept.

In a broadcast communication application, involving multiple receivers, the various receivers may have different and diverse processing capabilities which may be described in terms of different bandwidth and/or duration constraints. Additionally, there may exist uncertainty in the bandwidth and duration characteristics of the channel.

In a communication system utilizing a channel subject to hostile jamming, attempted interception and/or transmission blocking occurs within certain unknown frequency ranges and time intervals. Thus, similarly, unknown bandwidth and time-varying constraints are encountered.

In a communication system involving multiple access channels, such as that used in telephone and satellite communication systems, for examples, multiple communication users share each channel. In such applications, there exist only a few known fairly burdensome ways to differentiate among the multiple users. These few known ways include sharing in the time domain, sharing in the frequency domain, coding among users and combinations thereof. As such, the effective time and bandwidth channel restraints to a potential user are similar. Additionally, in communication systems involving packet switching schemes, such as those used in telephone and computer communication systems, packets of information are sent asynchronously. As such, routing problems exist such as potential collisions of such packets. These scenarios can present similar time and bandwidth constraints.

In a communication system involving fading channels, such as meteor burst channels, ocean acoustic channels, or mobile radio channels, strong attenuation exists in certain time intervals and/or frequency ranges.

In the meteor burst application, an optimum situation arises when a meteor burst occurs, for transmission of information. This optimum situation, however, is unpredictable and unreliable. In both the ocean acoustic and mobile radio channel scenarios, transmitted signals are subject to reflection and possible refraction and, therefore, both constructive and destructive interference occurs. This constructive and destructive interference is, for the most part, uncontrollable and unreliable. Therefore, these fading channel scenarios can present a situation analogous to that of a channel with unknown bandwidth and duration parameters.

Accordingly, a general purpose of the present invention is to provide a communication system capable of accurate transmission and reception of information.

SUMMARY OF THE INVENTION

The aforementioned problems are overcome by the communication system provided by the present invention, which is capable of accurate transmission and reception of information in a number of applications, including situations in which bandwidth and duration parameters of the channel are unknown.

This communication system includes a transmitter for embedding information into a waveform exhibiting "self-similar" properties over selected wide ranges of time and frequency. A self-similar waveform has the characteristic that dilations and contractions of the waveform in time, for example, by factors of two, are indistinguishable from the original waveform except to within some arbitrary amplitude scaling. FIG. 3A illustrates a simple waveform x(t) exhibiting self-similar properties. As illustrated, waveform x(t) is a time warped sinusoidal waveform of constant amplitude 1. Note that x(t) is shown as a simple time-warped sinusoid for simplicity and in general is more complex especially when it is conveying information. For example, as illustrated in FIG. 3C, x(t) is shown as a more complex self-similar waveform, as it may look when conveying information. As additionally illustrated in FIG. 3C, x(t) may have amplitude scaling. The simple time-warped sinusoid x(t), as illustrated in FIG. 3A, is represented by the equation $x(t)=\cos[2\pi\log_2 t]$. It is to be appreciated that this base 2 logarithm function is illustrated for example only.

An informative representation of a self-similar waveform is in terms of its time-frequency portrait. FIG. 3B illustrates such a time-frequency portrait of a typical self-similar waveform. It is useful to identify "windows" of frequency ranges which are referred to as "bands" herein. As illustrated in FIG. 3B, time is shown on the horizontal axis while frequency is shown on the vertical axis. The self-similar waveform has bands including B1 through B5 having associated bandwidths $\omega 1$ through $\omega 5$ which successively double (i.e., $\omega 2=2\times\omega 1$, $\omega 3=2\times\omega 2$, etc.). If one were to filter the waveform with bandwidth filters of bandwidths $\omega 1$ through $\omega 5$, one could view the bands B1 through B5. Then if one were to sample the waveform contained in each band at a rate proportional to the bandwidth, one could determine a time sequence contained in each band. For example, if one were to sample the waveform contained in band B5 at the appropriate rate, one would see that the sequence a, b, c, d . . . is contained in band B5. If one were to sample the waveform contained in band B4 at one-half of the rate used for sampling in band B5, one would discover that the same sequence appears in band B4. Similarly, if one were to sample the waveform contained in band B3, at one-half of the rate used to sample the waveform in band B4, one would discover that the same sequence is contained in band B3. This is also true for band B2 and band B1. Thus, a time-frequency portrait of a simple self-similar waveform, as illustrated in FIG. 3B, contains different bands of different bandwidths with the same sequence in each band included therein at a certain band-specific rate.

The transmitted waveform of the present invention is constructed by generating a self-similar signal where the information sequence, desired to be transmitted, is repeated in each band. That is, in each of the contiguous frequency bands whose bandwidths successively double, the information to be communicated is repeated therein at a certain rate. This rate is directly proportional to the bandwidth of the frequency band, and thus, also varies by a factor of two. Again, it is to be appreciated that the information to be communicated is described herein as a finite sequence of numbers, which may actually be the information desired to be communicated or may be a sampled representation of the information to be communicated.

In addition, the transmitted self-similar waveform has the property that detection of a time-segment of a short duration is sufficient to permit recovering the entire waveform, and hence the information, given adequate bandwidth. Similarly, detection of a low bandwidth approximation to the waveform is sufficient to permit recovering the undistorted waveform, and hence the information, given adequate duration. Such a communication system transmits waveforms which maintain their spectral efficiency over a broad range of rate-bandwidth combinations, thereby enabling efficient communication of information in the aforementioned applications.

More particularly, the transmitter includes circuitry for iterating a discrete time routine for embedding the information into a sequence of numbers. This sequence of numbers can be thought of as discrete time or sampled representation of a filtered version of the transmitted waveform.

The transmitter further includes circuitry for implementing a discrete-to-continuous time processing routine for embedding the sequence of numbers into a continuous waveform, that being the transmitted waveform. The transmitted waveform has a frequency domain spectrum with a selected number of different frequency bands. The information is repeated in each frequency band at a different rate. This rate, being constant throughout any particular frequency band, is proportional to the bandwidth of the frequency band. The bandwidths of the frequency bands vary by a factor of two and, therefore, the rate of repetition varies by a factor of two. The selected number of frequency bands equals the number of iterations of the discrete time routine.

The communication system of the present invention further includes a receiver for demodulating the received waveform, and recovering the communicated information. The receiver is designed to extract the repeated information, to collect together of the values of the repeated information, including the noise added by the channel, and average them to obtain an accurate estimate of the transmitted information.

One such receiver is designed for communication of a continuous valued sequence of information. In this embodiment, the receiver simply averages the received and extracted repeated information to generate an accurate estimation.

In an alternate embodiment of the present invention, the receiver is designed for communication of information involving two discrete values of the same amplitude, with one being "positive" and one being "negative". In this embodiment, the receiver circuitry compares an averaged value of the received information with a threshold value and makes a determination of transmitted information based on this comparison.

Other advantages, novel features and objects of the invention will become apparent from the following detailed description of the invention when considered in conjunction with the accompanying drawings.

BRIEF DESCRIPTION OF THE DRAWINGS

In the drawings,

FIG. 6 is a list of possible low pass filter for use in the discrete time iterative routine of a transmitter according to the present invention;

DETAILED DESCRIPTION

The present invention provides a novel communication system for communication of a number sequence. The number sequence may actually be the information desired to be communicated or it may represent the information desired to be communicated. For example, in a radio broadcast scenario, where an audio analog waveform is desired to be communicated, the sequence of numbers may be a sampled version of the audio analog waveform. The technique includes embedding the sequence of numbers within a transmitted waveform. In particular, the transmitter linearly transforms the sequence of numbers into a waveform possessing the property of self-similarity, as discussed above. The resulting waveform is an effective representation of the sequence of numbers for transmission over noisy, uncertain and/or hostile channels in both point to point and broadcast communication applications. These modulated waveforms have spectral characteristics very similar to those of 1/f processes and, therefore, are advantaqeous for use in a wide range of communications applications. This transmission scheme is discussed in detail in Research Laboratory of Electronics Technical Report No. 566, entitled "Synthesis, Analysis and Processing of Fractal Signals", by Gregory Wornell, Massachusetts Institute of Technology, Cambridqe, Mass., dated Oct. 31, 1991, which is herein incorporated by reference.

The transmitter of the present invention implements the modulation scheme to generate the transmitted waveform. When viewed from a frequency domain perspective, the transmitted waveform has a selected number of different frequency bands having bandwidths that are successive powers of two. It is envisioned, however, that the transmitted self-similar waveform may be constructed to have a selected number of different frequency bands having bandwidths that are successive powers of another self-simlarity parameter than two, where the parameter is not limited to an integer. The resulting self-similar waveform would be invariant to contractions and dilations of the waveform by factors of the parameter. Each of the frequency bands includes the sequence of numbers, representing the information to be communicated, repeated therein at a certain rate. This rate is directly proportional to the bandwidth of the frequency band. In addition, the energy level or power level in each frequency band varies inversely with the bandwidth of the frequency band.

Figure 1:
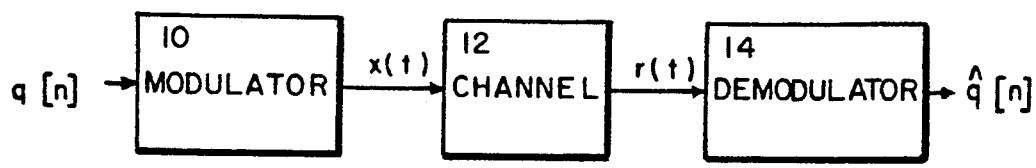
FIG. 1 is a block diagram of a communication system for transmitting a data sequence q[n] over a continuous amplitude, continuous-time, potentially noisy and unreliable channel.
Figure 2:
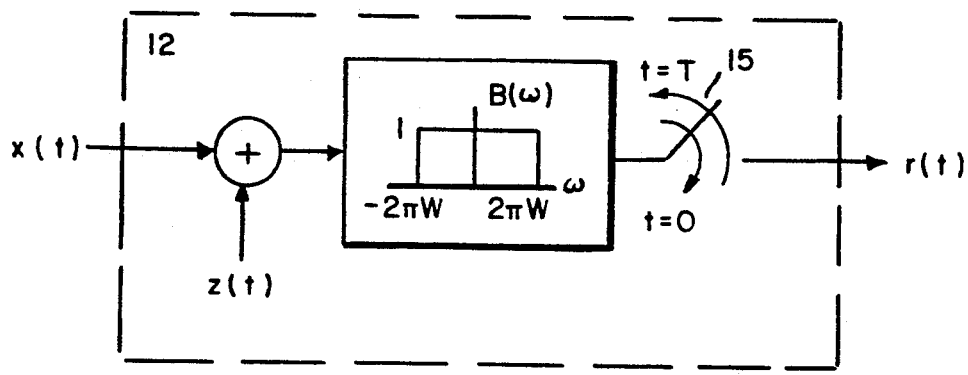
FIG. 2 is a block diagram of a channel model in a typical communication scenario.
Figure 3A:
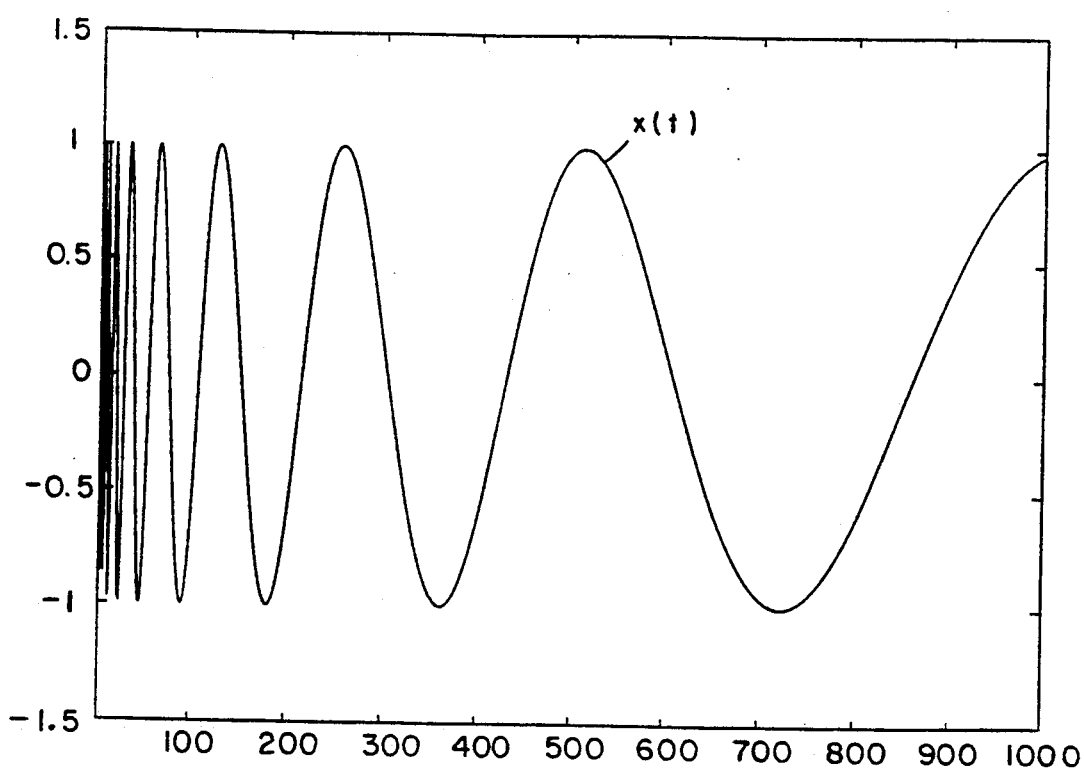
FIG. 3A is an illustration of a simple self-similar waveform.
Figure 3B:
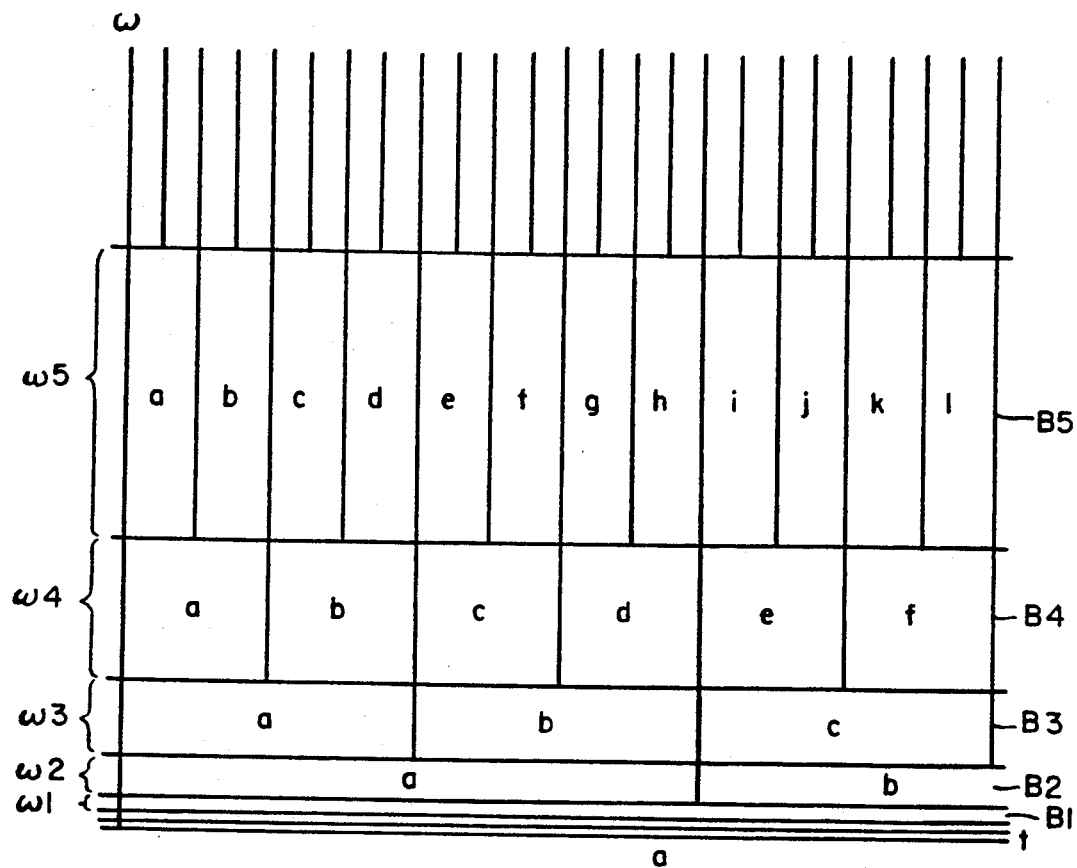
FIG. 3B is a time-frequency portrait of the simple self-similar waveform if FIG. 3A.
Figure 3C:
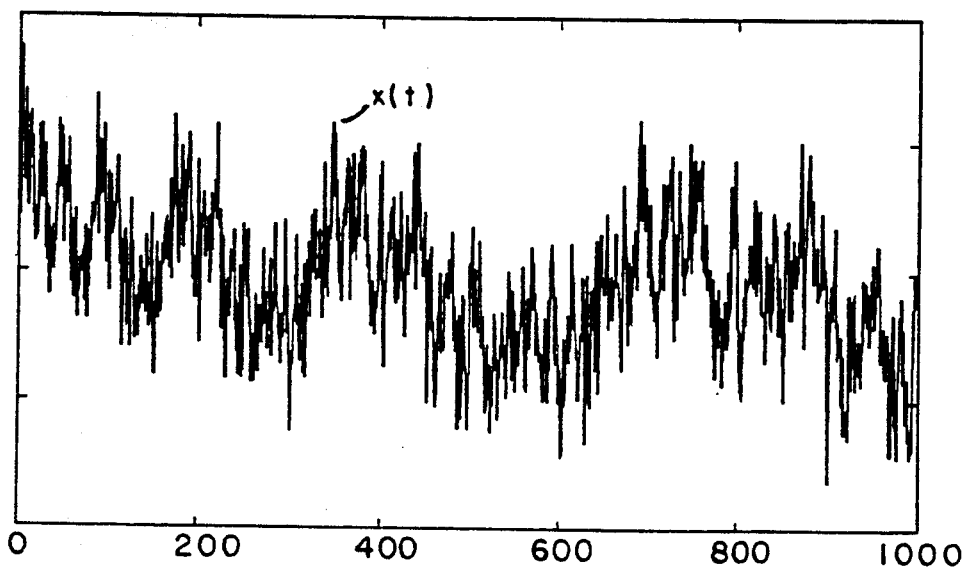
FIG. 3C is an illustration of a more complex self-similar waveform.
Figure 4:
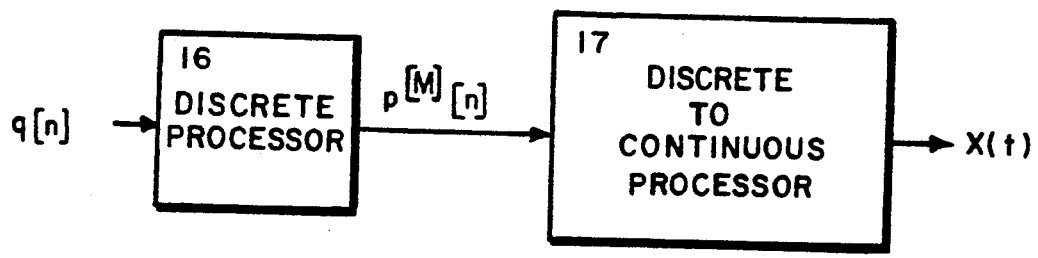
FIG. 4 is a block diagram of a transmitter according to the present invention.

The transmitter, as illustrated in block diagram form in FIG. 4, includes discrete time processor 16 in cascade with discrete-to-continuous time processor 17. The number sequence q[n] is inputted to discrete time processor 16 which generates a sequence of numbers, represented by $p^{[M]}[n]$. The information to be communicated is assumed to be a sequence of L independent numbers q[n] where: q[n]={q[0], q[1], q[2]...q[L−1]}. Discrete time processor 16 may include conventional computer circuitry, as will be discussed. This sequence of numbers, $p^{[M]}[n]$ is inputted to discrete-to-continuous time processor 17 which generates the single transmitted waveform x(t). As discussed, the transmitted waveform x(t) has a frequency domain spectrum with the sequence q[n] repeated within a number of frequency bands.

Discrete time processor 16, which may be implemented in various ways, such as using conventional digital signal processing chips to produce the sequence of numbers $p^{[M]}[n]$ from the information q[n], implements the following routine:

$$p^{[i+1]}[n] = \beta^i \sum_a \{h[n - 2a]p^{[i]}[a] + g[n - 2a]q[a]\}.$$

Figure 5:
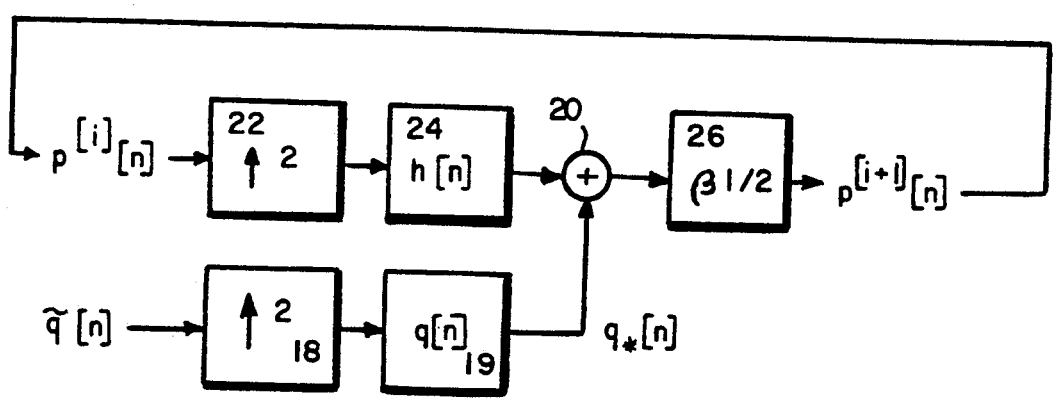
FIG. 5 is a block diagram of a discrete time iterative routine of a transmitter according to the present invention.

Referring now to FIG. 5, which is a block diagram illustrating the method for implementing this routine, this iterative routine is capable of a selected number of iterations. In FIG. 5, the input q[n] represents a number of repetitions of the finite sequence of numbers to be communicated, q[n]. In the process, q[n] is supplied to upsample filter circuit 18 and the latter inserts zeros between each and every number within the sequence q[n]. The output from the upsample filter circuit 18 is acted upon by filter with unit sample response g[n], 19. The output of filter with unit sample response g[n], 19, is denoted as q∗[n] which is fed into adder 20. Note that the process begins with $p^{[0]}[n]=0$. The $i^{th}$ iteration of this discrete time processing, $p^{[i]}[n]$, is fed into upsample filter circuit 22, the output of which is fed into filter with unit sample response h[n], 24. The output from filter with unit sample response h[n], 24, is added to q∗[n] by adder 20. The output from adder 20 is fed through amplifier 26. In the amplifier 26, β is a selected constant which controls the power level in each band. This discrete time processing routine repeats the data sequence q[n] at different rates within multiple frequency bands. The selected number of iterations of this discrete time processing routine, M, represents the number of frequency bands.

Unit sample responses h[n] 24 and g[n] 19 dictate how cleanly or sharply the different frequency bands will be separated. Unit sample response h[n] 24 is a discrete time low pass filter and unit sample response g[n] 19 is a discrete time high pass filter. Collectively, they are termed "quadrative mirror filters". In choosing a sequence for unit sample response h[n] 24, it is to be considered that with a sharper cut off low pass filter less frequency band overlap will result. The relationship between unit sample response g[n] 19 and h[n] 24 is the following: $g[n]=(-1)^n h[1-n]$. Typical working functions of unit sample response h[n] are listed in FIG. 6, which is an excerpt from I. Daubechies, "Orthonormal bases of compactly supported wavelets," *Commun. Pure Appl. Math.*, vol. 41, pp. 909–996, Nov. 1988. For more accurate low pass filters, with a sharper cut off, longer length filters should be used. For more information regarding these and other filters, refer to I. Daubechies, "Orthonormal bases of compactly supported wavelets," *Commun. Pure Appl. Math.*, vol. 41, pp. 909–996, Nov. 1988, which is incorporated by reference herein. Again, it is to be appreciated that discrete time processor 16 which implements the above-described routine, may include conventional digital signal processing chips. These chips would be designed in such a way as to carry out the routine.

Discrete to continuous time processor 17, as illustrated in FIG. 4, accepts the sequence of numbers $p^{[M]}[n]$ as an input and generates the transmitted waveform x(t) therefrom. This discrete-to-continuous time processor 17 includes both digital to analog converter 28 and low pass filter 30, in a series cascaded arrangement, as illustrated in FIG. 7.

Figure 7:
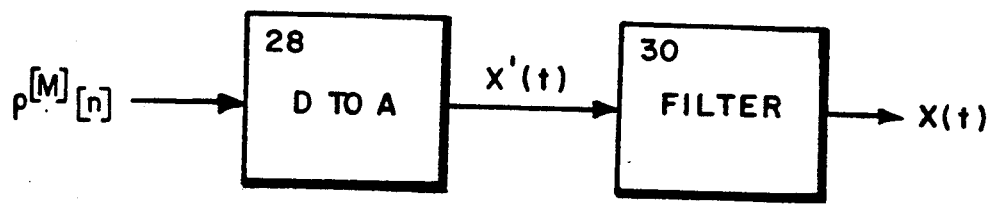
FIG. 7 is a block diagram of a discrete-to-continuous time processing routine of a transmitter according to the present invention.

Referring to FIG. 7, the sequence of numbers $p^{[M]}[n]$ is inputted to digital to analog converter 28 which produces the waveform x'(t). The digital-to-analog converter can be any conventionally known digital to-analog converter. The digital-to-analog converter produces a single waveform x'(t) from the sequence of numbers $p^{[M]}[n]$. The produced single waveform x'(t) is then fed into low pass filter 30 to produce transmitted waveform x(t).

The resulting transmitted waveform x(t) includes the sequence q[n] repeated at different rates within different frequency bands. If the data sequence q[n] is repeated enough times, within frequency bands acceptable for the particular application, recovery of the sequence q[n] can be accomplished accurately.

Figure 8:
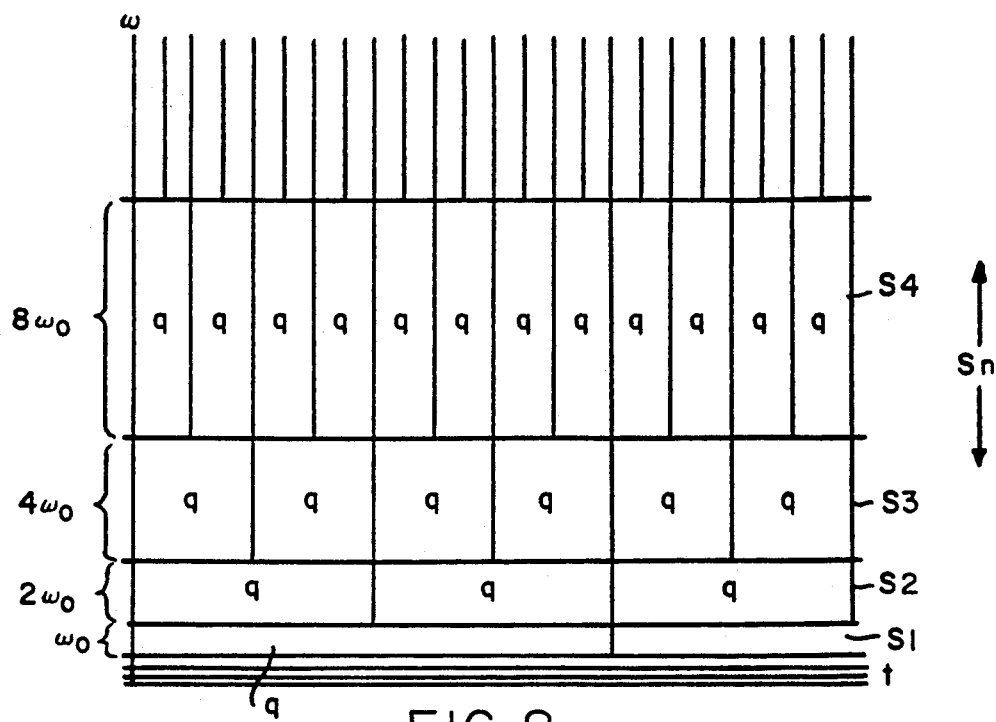
FIG. 8 illustrates a time frequency portrait of a transmitted signal according to the present invention.

Referring to FIG. 8, a time-frequency portrait of the transmitted signal x(t) can be viewed. In FIG. 8, q represents the finite sequence of consecutive numbers to be communicated. The horizontal axis is the time axis while the vertical axis is the (angular) frequency axis. As seen, the sequence q is repeated within a number of different frequency bands Sn. In the lowest frequency band, S1, with a bandwidth $\omega_o$ the sequence q is repeated at a low rate. In the next band level, S2, having a bandwidth $2\omega_o$, the sequence q is repeated at twice the rate as that of $\omega_o$. In the next higher frequency band, S3, having a bandwidth $4\omega_o$, the sequence q is repeated at four times the rate as that of $\omega_o$. Therefore, as the bandwidth of the frequency band Sn increases by a factor of two, the information redundancy existing within that frequency band is doubled. Hence, the greater the bandwidth of the channel, the more information there exists from which to make an accurate recovery. Additionally, the greater the time duration the channel will allow, the greater the information there exists from which to make an accurate recovery. The graph of FIG. 8, with the above description, illustrates the time bandwidth trade-off present within the communication system of the present invention.

Figure 9:
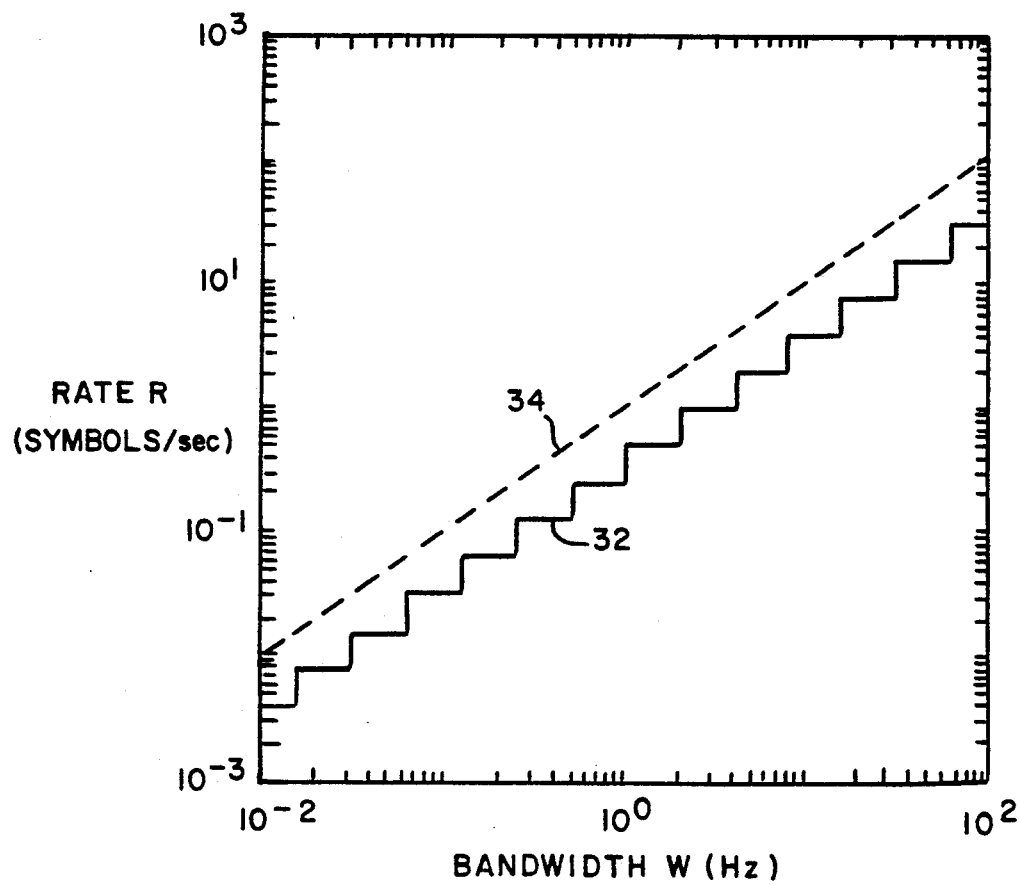
FIG. 9 is a graph illustrating the relative spectral efficiency of the modulation scheme according to the present invention.

Having such characteristics of the transmitted waveform x(t), certain rate-bandwidth trade-offs must be made by the receiver in demodulating the transmitted information. FIG. 9 is a graph illustrating the relative spectral efficiency of the transmitter employing the modulation scheme of the present invention. The vertical axis represents the rate R in symbols per second and the horizontal axis represents the bandwidth W in Hz. The stepped solid curve 32 indicates the maximum rate at which the transmitted sequence can be recovered in the absence of noise by a receiver for the communication system of the present invention. The dashed curve 34 illustrates the corresponding rate for an optimal modulation scheme in which the transmitter has perfect knowledge of the rate-bandwidth characteristics of the channel. In this optimal modulation scheme, the transmitter would send the data sequence at as fast a rate as the channel would accommodate, utilizing the full bandwidth of the channel.

In the absence of noise, a receiver generally can, in principle, perfectly recover the sequence q[n], using rate-bandwidth combinations that lie on or below the solid curve 32. In accordance with this graph, the rate (R) corresponding to the bandwidth equaling 1 Hz is $R = \eta_{invention}$, where $\eta_{invention}$ is the maximum rate per given bandwidth or $R_{max}/W$, which is the spectral efficiency of the present modulation scheme. The stepped character of the solid curve 32 reflects the fact that only rates of the form $2^M$ can be accommodated during transmission, and that full band frequency increases in signal bandwidth are required to enable q[n] to be demodulated at successively higher rates. As aforementioned, the dashed line 34 represents the performance of an optimal transmission scheme, in which the transmitter has full knowledge of the rate bandwidth characteristics of the channel. It is to be appreciated, however, that in the aforementioned applications, the transmitter has no knowledge or access to these channel parameters. Therefore, the communication scheme according to the present invention provides for accurate recovery in these common applications.

The modulation scheme of the present invention generates a transmitted waveform x(t). Within this transmitted waveform x(t), q[n] is modulated at different rates within M different frequency bands. In the Mth band, q[n] is modulated at a rate $2^M$ using a double sided bandwidth of $2^M$ Hz. The energy per symbol used in successively higher bands M bands inversely with $\beta$. With such a transmission, a suitably designed receiver can recover q[n] at a rate $2^M$ using a base band bandwidth of $2^{M+1}$Hz. This modulation scheme has a spectral efficiency $\eta_{invention} = \frac{1}{2}$ symbol/sec/Hz, which is equal to $\frac{1}{2}$ that of the spectral efficiency of the optimal transmission system represented by $\eta_{optimal} = 1$ symbol/sec/Hz. This slight loss in efficiency is the price paid to enable a receiver to use any of a broad range of rate-bandwidth combinations to accommodate the unknown characteristics of the channel or its own internal processing constraints.

The rate, bandwidth, and power characteristics of the transmitted signal are selected and depend upon the particular communications application. These parameters are selected by anticipating the operating ranges of the channel. If the duration and bandwidth constraints in the channel are unknown or inaccessible to the transmitter, a wide range of bandwidths and time periods, corresponding to a sufficient time bandwidth product, is selected to accommodate any extremes within the channel.

In an application involving multiple receivers of different and unknown processing capabilities, a wide range of duration and bandwidth parameters of the transmitted signal are selected to accommodate all of the receivers. Where interception or blocking attempts are anticipated among certain frequency ranges, the transmitted signal will be transmitted among many frequency bands, avoiding those anticipated to present problems. In both the multiple access communications applications, the transmission scheme of the present invention offers multiple time durations and frequency bands for transmission. In a fading channel application, a sufficient time-bandwidth product is selected for enabling an accurate recovery. In applications where secret communications are desired, the power parameter can be selected such that the transmitted signal resembles 1/f noise. This 1/f noise, including the special case of white noise, is common in many channels. When the transmitted signal is made to resemble 1/f noise, which is present in the channel, it is improbable that any unintended receiver will be able to distinguish the transmitted signal from the noise in the channel. Knowledge of the bands within which the signal is transmitted, will allow an intended receiver to demodulate the received signal within these bands. Using the known self-similarity parameter, that being two in the disclosed embodiment, the receiver can filter and sample within each of the frequency bands to recover the information communicated. Again, the modulation transmission scheme of the present invention allows for generating a transmitted signal which resembles any type of 1/f noise.

As aforementioned, the lower frequency bands of the transmitted signal will have more power associated therewith. $\beta$ represents the relative power from band to band. The value of $\beta$ affects the power spectrum of the transmitted signal. As $\beta$ is increased, the power will fall off quickly from band to band, as the frequency is increased. When the noise and bandwidth of the channel are unknown, it is desirable to match the power spectrum transmitted to that of the noise power spectrum in the channel, even for applications where communication is not intended to be secret. This is so because such a strategy maximizes the worst case performance over all possible channel parameters.

The advantages to the modulation scheme of the present invention are numerous. In particular, in noise free channels, the modulated information can be perfectly recovered, given sufficient bandwidth, from a short duration segment of the transmitted waveform (see FIG. 9). Similarly, from observations of a low bandwidth, the information can be perfectly recovered, given a segment of sufficient duration. More generally, given any of a broad range of time bandwidth tradeoffs to accommodate, which may correspond to channel constraints, multiple receivers, or the like, the information can be accurately recovered.

In applications involving a channel with noise, this modulation scheme allows a receiver to exploit all available bandwidth and duration to recover the information as accurately as possible. With either unlimited bandwidth or duration, perfect transmission is possible. In addition, the spectral characteristics of the transmitted waveform can be made indistinguishable from that of 1/f noise, making it desirable in non-public communications applications. Because 1/f noises, including the special case of white noise, are highly prevalent forms of natural background noises in many channels, fractal modulation is an advantageous transmission scheme for many other communications applications.

A description of receiver designs follows. The design of the receiver depends upon the sequence of information being transmitted. In a preferred embodiment of the present invention, a receiver is designed for receiving transmission of a continuous valued sequence of information. In an alternate embodiment of the present invention, a receiver is designed for receiving transmission of a discrete valued sequence.

A receiver designed for a continuous valued sequence will be described below. Such a receiver is illustrated, in block diagram form, in FIG. 10. The information to be communicated is assumed to be a sequence of L independent numbers q[n], specifically $\{q[0], q[1], q[2] \ldots q[L-1]\}$.

The sequence q[n] may be the actual information desired to be communicated or may be representative of the information to be communicated. For example, q[n] may be a sampled version of an audio analog waveform desired to be communicated. The signal received at the receiver r(t) will be a corrupted version of the transmitted signal. The bandwidth and duration characteristics of the channel preclude access to all but a subset of the multiple repetitions q[n]. Furthermore, these repetitions will be noisy due to the additive channel noise.

Figure 10:
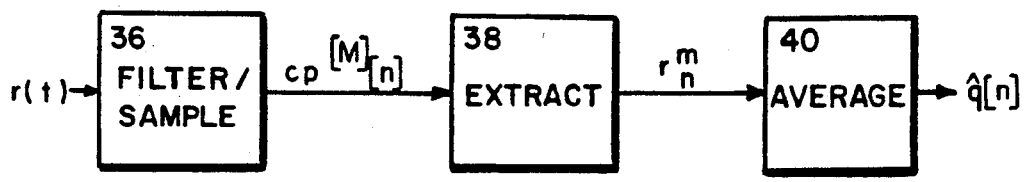
FIG. 10 is a block diagram illustrating a cascaded design of a preferred embodiment receiver according to the present invention.

Referring to FIG. 10, a block diagram of a receiver of the present invention is illustrated. As illustrated, the receiver includes, in cascaded form, pre filter and sample circuit 36, extracting processor 38, and averaging processor 40. As illustrated, received signal r(t) is received by the receiver and inputted to pre-filter and sample circuit 36 which produces the sequence of numbers $cp^{[M]}[n]$, which is a low-pass, filtered, truncated, and noisy version of the sequence of numbers $p^{[M]}[n]$ originally produced by discrete time processor 16. This sequence of numbers $cp^{[M]}[n]$ is inputted to extracting processor 38 which produces the repeated information q[n] with noise added in by the channel, as represented by $r^m{}_n$. These values $r^m{}_n$ are then inputted to averaging processor 40 which produces a recovered information value $\hat{q}[n]$.

Pre-filter and sample circuit 36 may include any conventional low pass filter in cascade with a conventional analog-to-digital converter.

Pre-filter and sample circuit 36 implements a pre-filtering routine to clean up the received signal r(t) by sharpening the cut off at the highest frequency band altered by the channel.

Extracting processor 38 may include conventional digital signal processing chips which implement a routine for extracting the repeated information, $r^m{}_n$ (being power scaled due to the transmitter and having noise due to the channel), from the sequence of numbers $cp^{[M]}[n]$. This routine is a discrete time processing routine.

Figure 11:
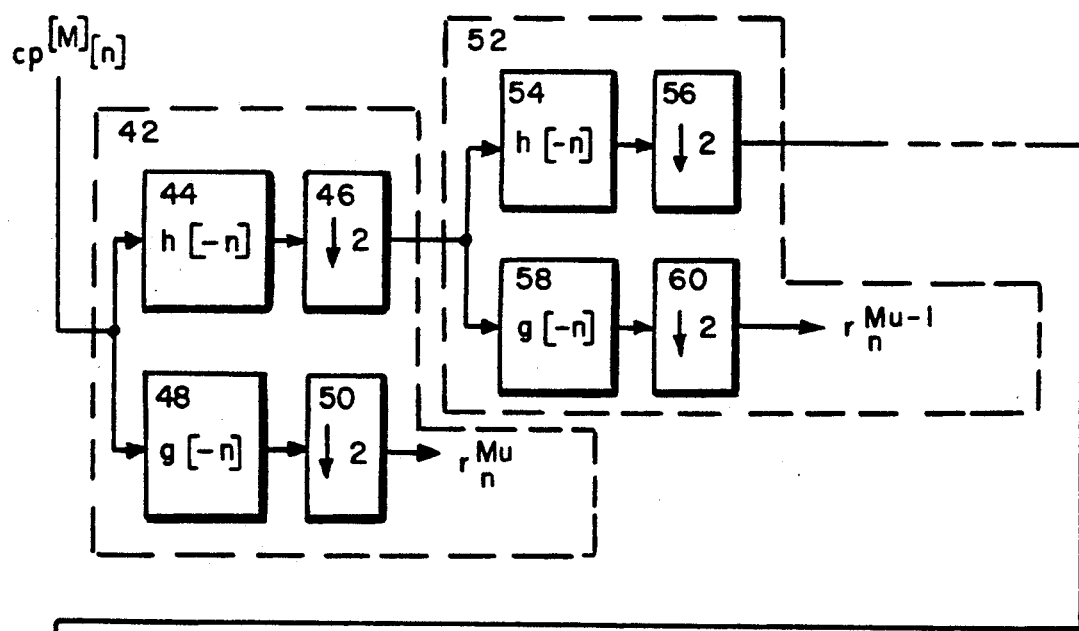
FIG. 11 is a block diagram illustrating a discrete time processing routine of a preferred embodiment receiver according to the present invention.
Figure 11:
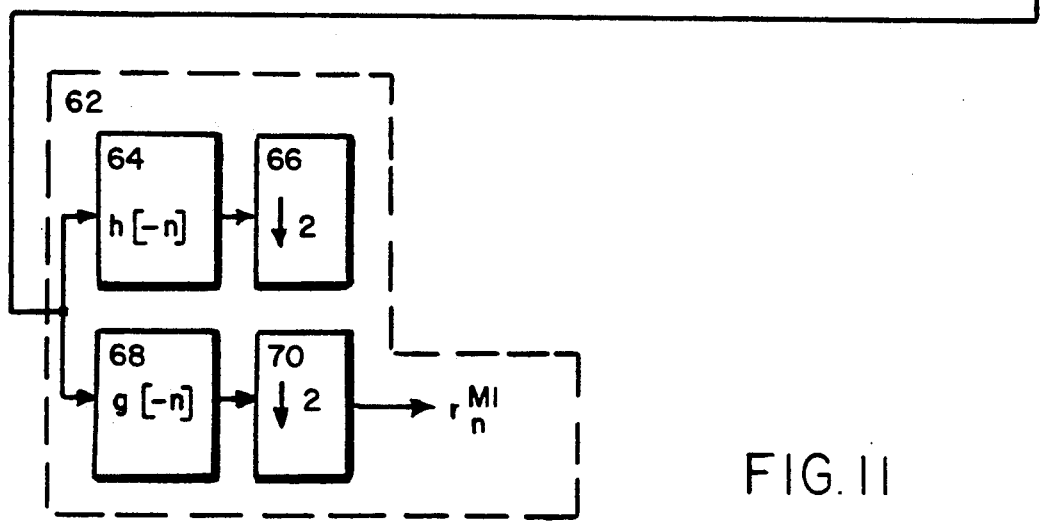

The discrete time processing routine as implemented by extracting processor 38, for generating the sequence of repeated numbers $r^m{}_n$, being power scaled and having noise associated therewith, is illustrated in more detail in block diagram form in FIG. 11. As illustrated, the sequence $cp^{[M]}[n]$ is inputted to the first stage 42 of the iterative routine which generates noisy repetitions of q[n] corresponding to the highest frequency band, $r_n{}^{M_u}$. An output is fed from the first stage 42 into the second stage 52 which generates a number, $r_n{}^{M_u-1}$, which corresponds to numbers in the next highest frequency band. This process is repeated, going from stage to stage, until it reaches the final stage 62 and numbers, $r_n{}^{M_L}$, corresponding to the lowest frequency band, is produced.

As seen, $cp^{[M]}[n]$ is inputted to the first stage 42 and fed to low pass filter with unit sample response $h[-n]$ 44 and high pass filter with unit sample response $g[-n]$ 48. It is to be appreciated that unit sample response $h[-n]$ is equal to the unit sample response $h[n]$, as illustrated in FIG. 5 with respect to the transmission scheme, to within a time reversal. The output of unit sample response $g[-n]$ 48 is fed to downsample filter 50. The output from this downsample filter 50 produces $r_n{}^{M_u}$. The output from unit sample response $h[-n]$ 44 is fed to downsample filter 46. The output from downsample filter 46 is fed to the next stage 52. As illustrated, the next stage 52 has cascaded circuitry identical to that of the first stage 42. The next stage 52 has unit sample response $h[-n]$ 54, downsample filter 56, unit sample response $q[-n]$ 58, and downsample filter 60. Similarly, the final stage 62 has unit sample response $h[-n]$ 64, downsample filter 66, unit sample response $g[-n]$ 68, and downsample filter 70.

As aforementioned with reference to FIG. 10, averaging processor 40 receives the values $r_n{}^m$ and produces the recovered information value $\hat{q}[n]$. Averaging processor 40 may include conventional digital signal processing chips to perform an adding and averaging routine. This method will be described below. The averaging and adding routine performed by averaging processor 40 is represented by:

$$\hat{q}[n] = \frac{1}{K + (1/\sigma_{x/z}^2)} \sum_{m=M_L}^{M_u} \beta^{m/2} \sum_{d=0}^{2^{m-M_L}-1} r^m_{n+dL}$$

wherein:

K = the number of times q[n] is repeated in the received signal;

$M_L$ represents a value corresponding to the lowest frequency band;

$M_u$ represents a value corresponding to the highest frequency band;

$r_n{}^m$ represents one number within each of the sequences q[n] such as q[0] or q[1] being power scaled due to the transmission scheme and having noise from the channel;

$\sigma_{x/z}^2$ represents the SNR corresponding to each $r_n{}^m$ measurement; and $\beta^{m/2}$ is a weighting function to accommodate for power distribution among the frequency bands.

It is to be appreciated that the values of $M_L$ and $M_u$ are not solely dictated by the frequency band values selected during transmission. These received frequency band values are a function of the bandwidth and duration parameters of the channel because the channel alters the transmitted signal. Provided enough repetitions of the sequence q[n] are available to the receiver, an accurate recovery of the sequence q[n] is attainable.

As aforementioned, FIG. 9 illustrates a graph of the relative performance of the communication system of the present invention, in the absence of noise when channel constraints are unknown to the transmitter.

Performance of the above-described receiver of the present invention can be viewed in terms of the mean square error (hereinafter "MSE") when noise is present. The MSE of the receiver of the present invention can be compared to that of an optimal receiver which receives a transmitted signal from an optimal transmitter, described above, which has access to channel constraints such as rate and bandwidth parameters. The MSE of the receiver is obtained as:

$$\epsilon^2 = \frac{1}{1 + K\sigma_{x/z}^2}$$

wherein:

K = the number of noisy samples or repetitions of the sequence q[n] received by the receiver; and $\sigma_{x/z}^2$ = SNR of observations.

The number of samples received by the receiver is affected by the bandwidth and duration parameters of the channel. Transforming the duration constraint (T) of the channel into a rate constraint (R) according to R=L/T, K can be rewritten in terms of the rate (R) and the bandwidth (W). The receiver can determine these parameters. The MSE of the receiver, rewritten in terms of the rate and bandwidth is:

$$\epsilon^2 = \frac{1}{(1 + \sigma_{x/z}^2)^{\frac{2\eta_{invention}}{R/W}} - 1}$$

Figure 12:
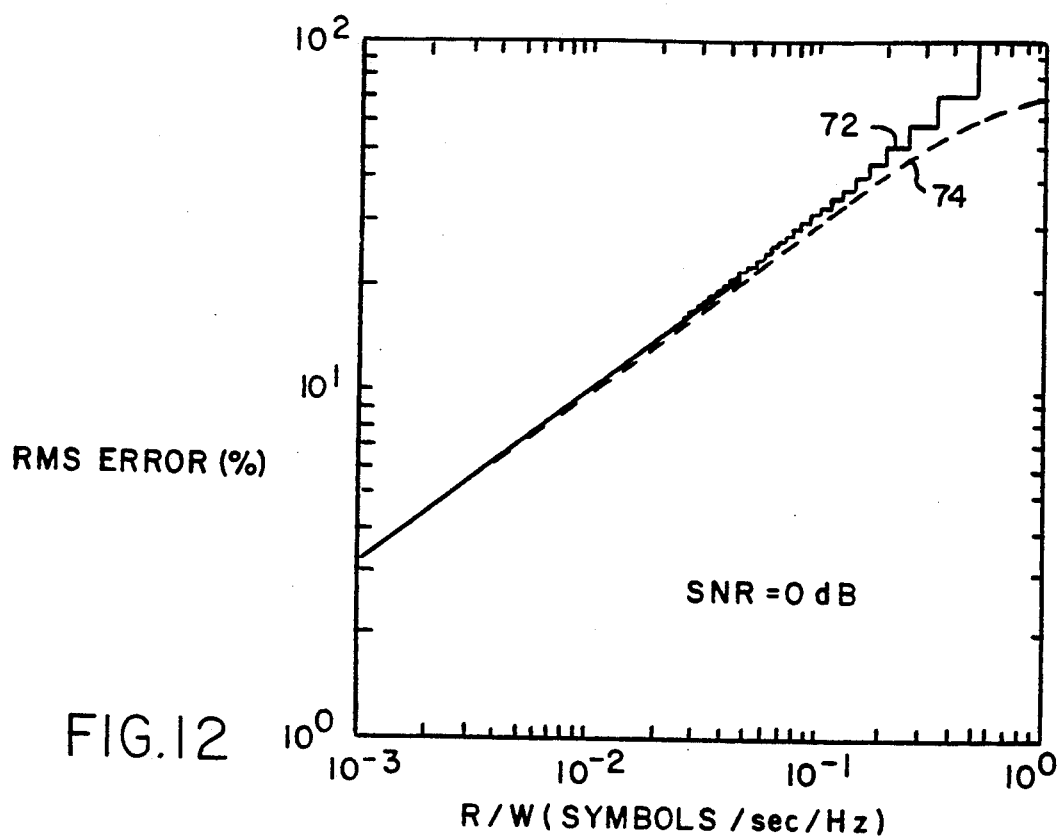
FIG. 12 is a graph illustrating the relative performance in terms of the rate and bandwidth of a receiver designed for a continuous valued sequence, according to the present invention.

Referring to FIG. 12, the graph illustrates the relative performance of the designed receiver, compared to that of an optimal receiver in terms of the MSE as a function of the rate/bandwidth ratio R/W. The solid line 72 represents the performance of the receiver of the present invention with a modulation transmission scheme, with unknown channel bandwidth and duration parameters, while the dashed line 74 corresponds to the performance of the optimal receiver. The SNR is zero dB in this example. As seen, the MSE of a receiver of the present invention closely matches that of an optimal receiver up until the rate bandwidth (i.e., R/W) ratio gets very large. As illustrated, as the bandwidth increases, which corresponds to the rate decreasing, the MSE decreases.

Figure 13:
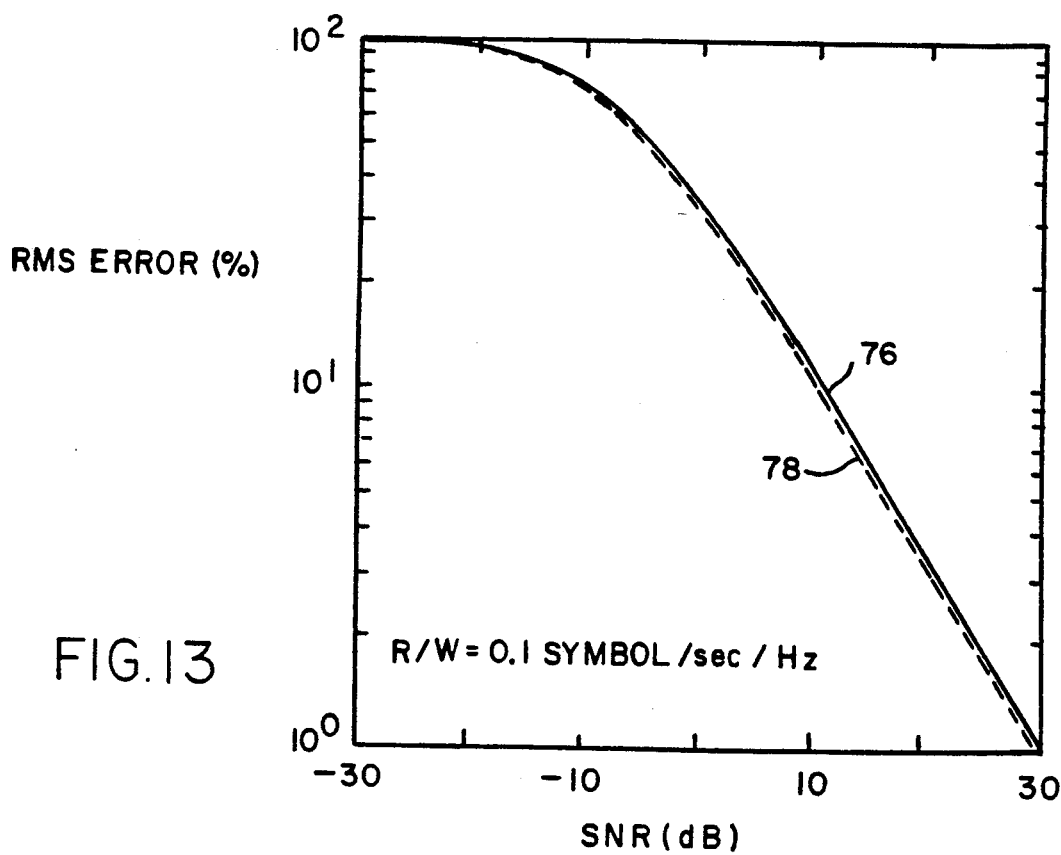
FIG. 13 is a graph of the relative performance in terms of the SNR of a receiver designed for a continuous valued sequence, according to the present invention.

Referring to FIG. 13, the relative performance of the receiver of the present invention is alternatively illustrated in graph form, with the MSE shown as a function of the SNR at R/W=0.1 symbols/sec/Hz. As seen, the performance of the receiver of the present invention closely matches that of the optimal receiver. As shown, the MSE decreases as the SNR increases.

Described below is the design of a receiver, in an alternate embodiment of the present invention, useful when the information being communicated has two discrete values, (e.g., one being positive and one being negative). Such a receiver is illustrated, in block diagram form, in FIG. 12. The notation representing these values is $\pm\sqrt{E_0}$. The general scheme utilized by the receiver is to add up all of the noisy values of the repeated received sequence, average these values, and compare this average to a threshold value. If the average is greater than the threshold value, then the receiver will estimate that a positive value of the data sequence, $+\sqrt{E_0}$, has been transmitted. If the average value is less than the threshold value, then the receiver will estimate that the negative discrete value, $-\sqrt{E_0}$, has been transmitted.

Figure 14:
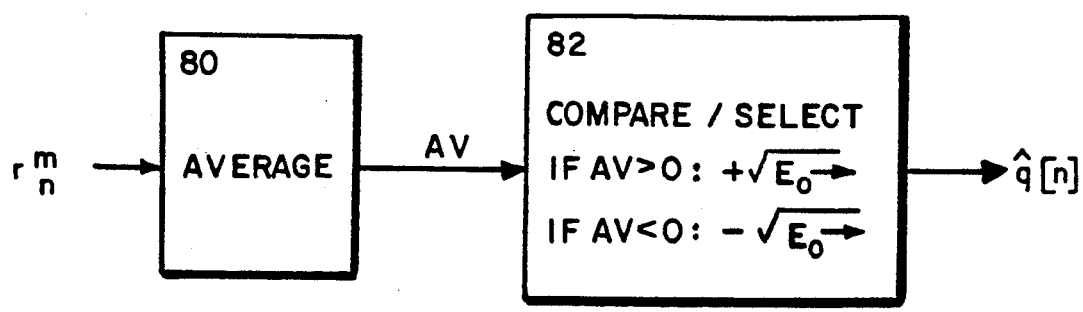
FIG. 14 is a block diagram of a discrete time processing routine of an alternate embodiment of a receiver according to the present invention.

In the receiver design of this alternate embodiment, pre filter and sample circuit 36 and extracting processor 38, as illustrated in FIG. 10 with respect to the receiver design of the preferred embodiment, are utilized. The receiver design of this alternate embodiment is illustrated in block diagram form in FIG. 14. As illustrated, the sequence of numbers outputted from extracting processor 38, $r_n^m$, is inputted to the discrete averaging processor 80. Averaging processor 80 accepts the values $r_n^m$ as input and produces an average value AV. Average value AV is inputted to comparator circuit 82 which produces the recovered information value $\hat{q}[n]$.

Averaging processor 80 implements a routine for adding up all the values of $r_n^m$ and averaging them yielding the average value AV. Averaging processor 80 may include conventional digital signal processing chips for implementing a discrete time processing routine for producing the average value AV. This discrete time processing routine is represented by the equation:

$$AV = \sum_{m=M_L}^{M_u} \sum_{d=0}^{2^m - ML - 1} \frac{r_{n+dL}^m \cdot \sqrt{E} \beta^{-m/2}}{\sigma_z^2 \beta^{-m}}$$

wherein:

$$\frac{\sqrt{E}}{\sigma_z^2}$$

is related to the SNR.

Comparator circuit 82 may include a comparator outputs an estimated value based upon a comparison.

Comparator circuit 82 is designed to implement the following routine. The average value AV is compared with the threshold value 0. If AV>0, the comparator circuit 82 will estimate that the positive value, $+\sqrt{E_0}$, has been transmitted. If AV<0, the comparator circuit 82 will estimate that the negative value, $-\sqrt{E_0}$, has been transmitted.

The performance of this receiver design of the present invention can be viewed in terms of the probability that the receiver will make an error in the decision. This probability, described as the bit-error probability $P_r(\epsilon)$, is represented as:

$$P_r(\epsilon) = Q\left(1/2\sqrt{K\sigma_{x/z}^2}\right)$$

wherein Q is a complementary error function defined by:

$$Q(x) = \frac{1}{\sqrt{2\pi}} \int_x^\infty e^{-v^2/2} dv$$

K can be rewritten in terms of the rate (R) and bandwidth (W). The probability, therefore, can be described in terms of the rate and bandwidth. This probability is represented as:

$$P_r(\epsilon) = Q\left(1/2\sqrt{\sigma_{x/z}^2 \frac{2\eta_{invention}}{R/W} - 1}\right)$$

Figure 15:
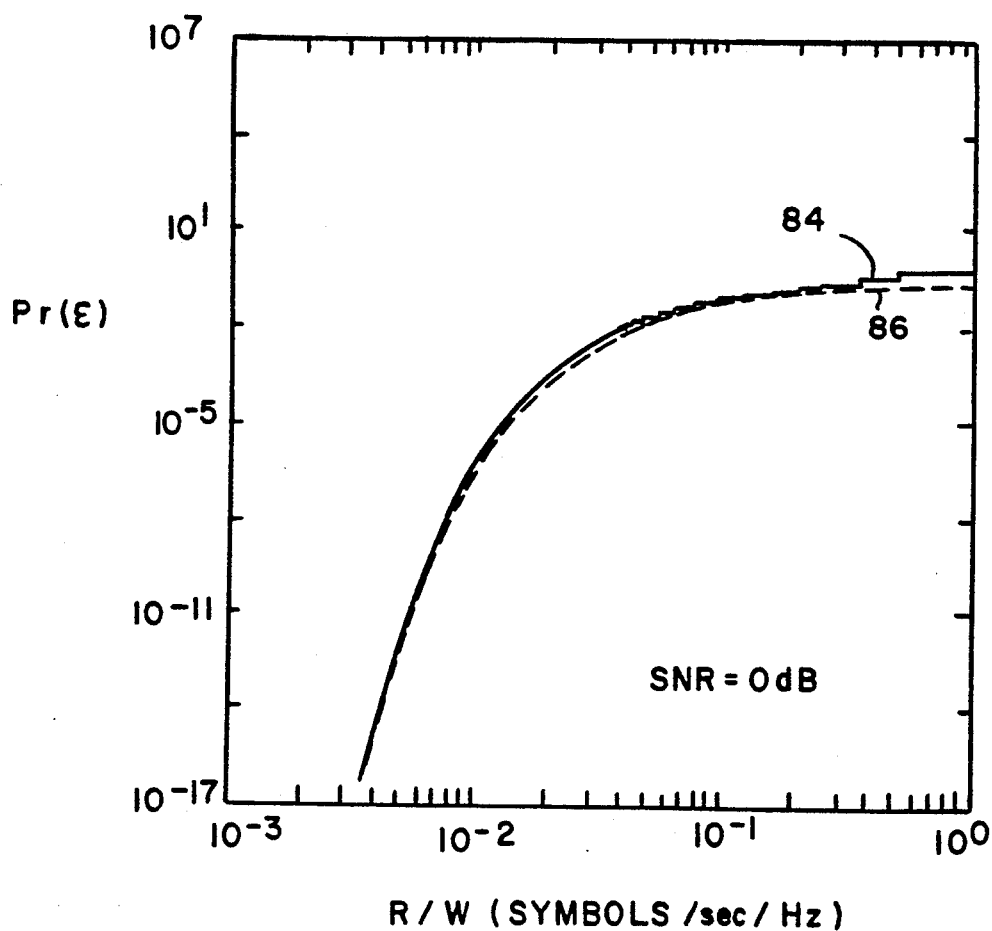
FIG. 15 is a graph illustrating the performance in terms of rate and bandwidth for a receiver designed for a bi-valued sequence, according to the present invention.

The relative performance probabilities can be plotted both as a function of the rate/bandwidth ratio and the SNR. Referring to FIG. 15, the graph illustrates the performance of the receiver in terms of the probability of error with respect to the rate-bandwidth R/W ratio at zero dB. The solid line 84 indicates the performance of the receiver of the present invention while the dashed line 86 indicates the performance of the optimal receiver. As seen, the performance of the receiver of the present invention nearly matches that of the optimal receiver. As shown, as the rate decreases, the probability of error also decreases.

Figure 16:
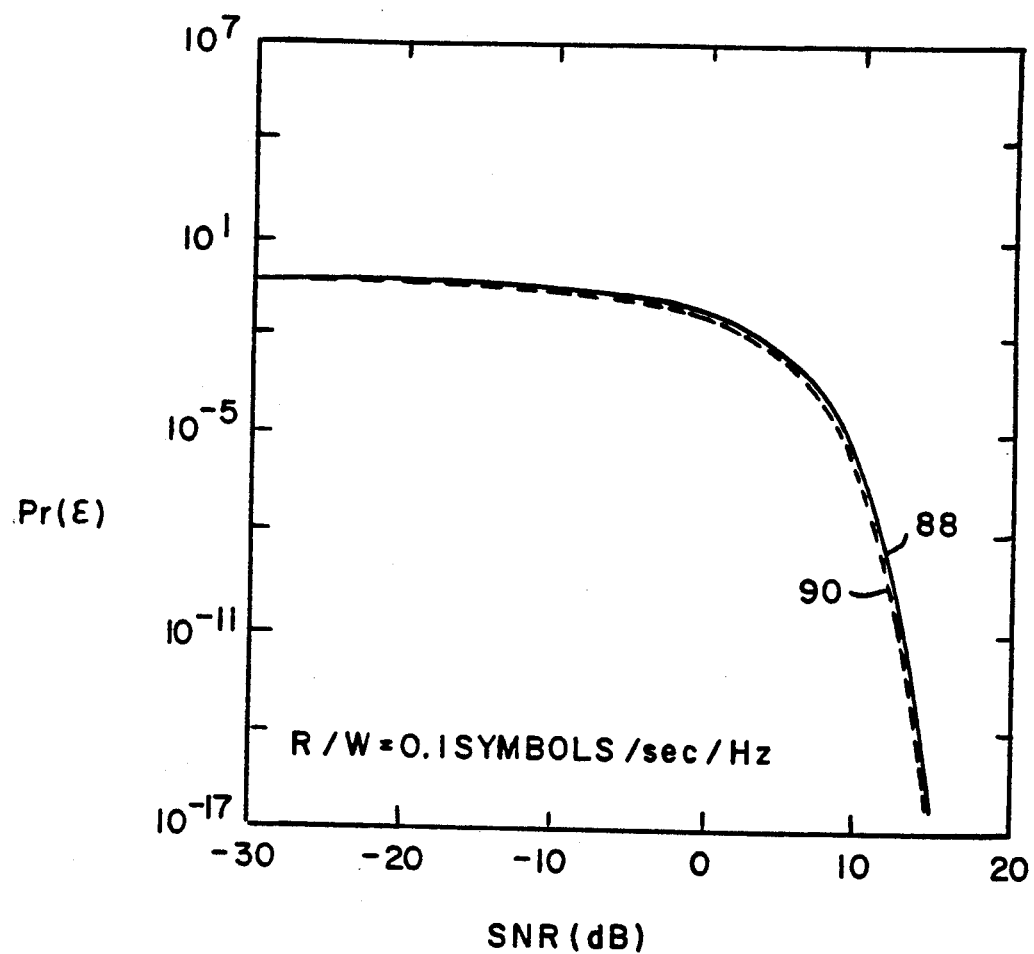
FIG. 16 is a graph illustrating the performance in terms of the SNR of a receiver designed for a bi-valued sequence, according to the present invention.

FIG. 16 illustrates a graph of the performance of the receiver of the present invention with respect to the probability of error in terms of the SNR at R/W=0.1 symbols/sec/Hz. Similarly, the solid line 88 indicates the performance of the receiver of the present invention where the dashed line 90 indicates the performance of the optimal receiver. As seen, as the SNR is increased, the probability of error is decreased.

In all communications applications, there is a time delay between when the signal is transmitted and when the signal is received. Thus, in order to avoid inaccuracies in deciding the transmitted information, the receiver typically must be synchronized to the transmitter. Synchronizing receivers with transmitters in the communications field is sometimes problematic. In some applications, where the time delay is known, no problem is presented in synchronizing the receiver with the transmitter. In applications, however, where the time delay is unknown, inaccuracies may result if the receiver is not properly synchronized. In typical communications applications, schemes are provided for achieving close synchronization. Many of these schemes involve either estimating the time delay or transmitting certain side information along with the transmitted signal, the side information being employed for providing the receiver with information for synchronizing with the transmitter. Depending upon the communications application involved, any of a variety of known synchronization schemes may be employed with the disclosed communication scheme of the present invention.

Figure 17:
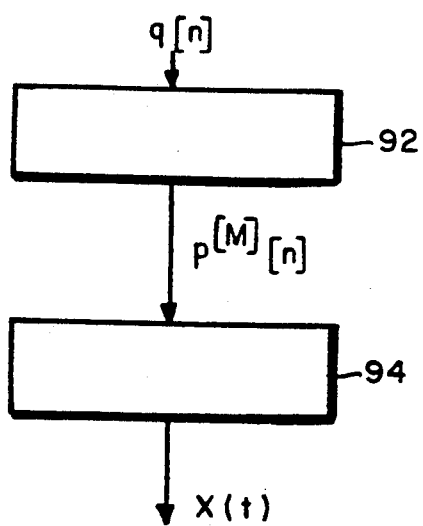
FIG. 17 is a flow chart illustrating the steps involved in generating the transmitted waveform from the information to be communicated.
Figure 18:
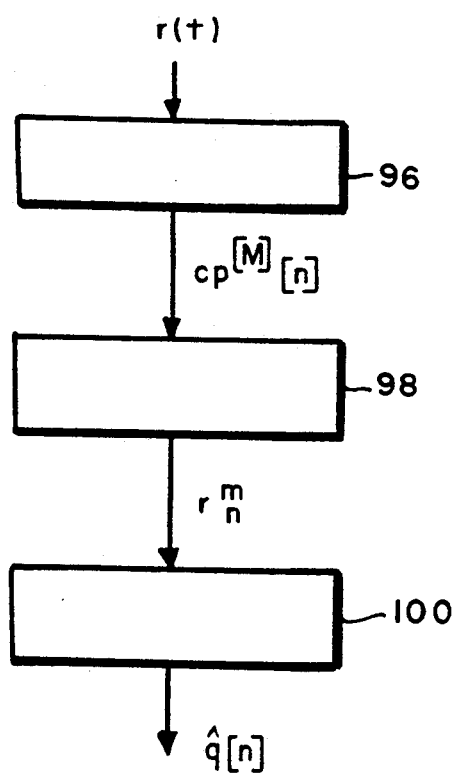
FIG. 18 is a flow chart illustrating the steps involved in generating an estimated information value from the received signal for communication of a continuous valued sequence.
Figure 19:
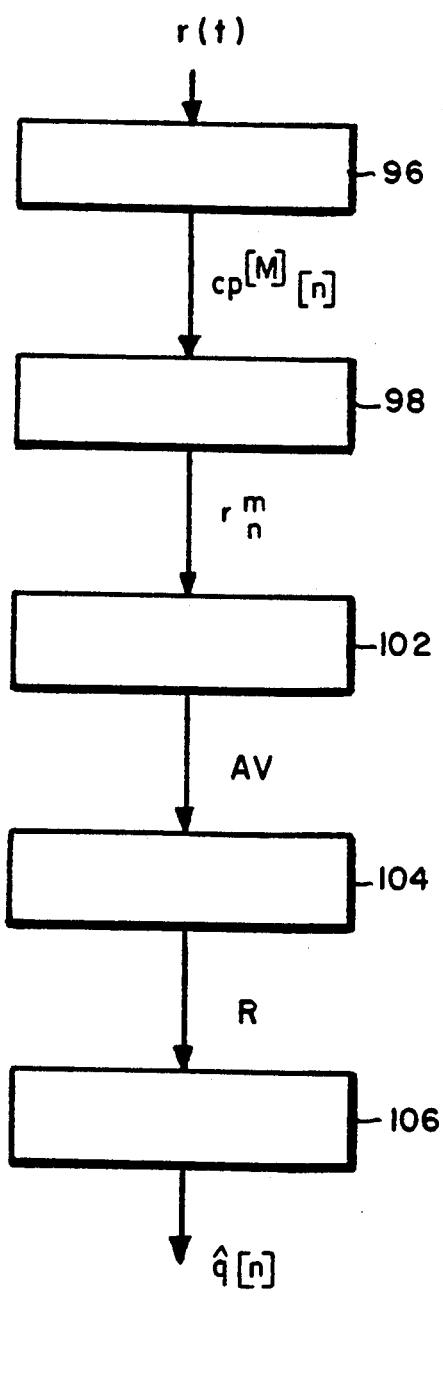
FIG. 19 is a flow chart illustrating the steps involved in generating an estimated information value from a received signal for a bi-valued sequence.

Thus, it is to be appreciated that what is taught is a method for communicating information by transmitting a novel waveform, having self-similar properties. This method is to be understood with reference to FIGS. 17, 18 and 19. FIG. 17 is a flow chart illustrating an exemplary set of steps involved in the generation of the transmitted waveform x(t). FIG. 18 is a flow chart illustrating an exemplary set of the steps involved in generating a recovered information value $\hat{q}[n]$ from the received waveform r(t) when communicating a continuous sequence of numbers. FIG. 19 is a flow chart illustrating an exemplary set of steps involved in generating a recovered information value $\hat{q}[n]$ from the received waveform when communicating a bi-valued sequence.

With reference to FIG. 17, the first step 92 in generating the transmitted waveform x(t) includes producing the sequence of numbers $p^{[M]}[n]$ from the information q[n] to be communicated. As previously described, this step 92 for producing the sequence of numbers $p^{[M]}[n]$ is carried out by implementing the discrete time routine of FIG. 5. The second step in producing the transmitted signal x(t) from the sequence to $p^{[M]}[n]$ is to convert the sequence an analog waveform and then filter this waveform. As aforementioned, this step 94 is carried out by a digital to-analog converter and a filter.

FIG. 18 is a flow chart illustrating the steps required for producing a recovered information value $\hat{q}[n]$ from a received signal r(t) when communicating a continuous sequence of number. As illustrated, the first step 96 in such a receiver method is to produce the sequence of number $cp^{[M]}[n]$. This first step 96 includes performing initial filtering upon the received signal r(t) and then sampling that filtered received signal. The next step 98 in this receiver method is to extract the values $r_n^m$ from the sequence of numbers $cp^{[M]}[n]$. This next step 98, is performed by implementing the discrete time routine of FIG. 11. The final step 100 includes averaging all the values $r_n^m$ to achieve a recovered information value $\hat{q}[n]$.

FIG. 19 is a flow chart illustrating the steps involved in the method for generating a recovered information value $\hat{q}[n]$ from a received signal r(t) when the information communicated is a bi-valued sequence, one value being positive and the other being negative. The first two steps 96 and 98 are identical to that of the flow chart of FIG. 18. The next step 102 involves averaging all of the values $r_n^m$ to produce the average value AV. The next step 104 includes comparing this average value to a threshold value, that being zero, and producing result R. The final step 106 includes selecting a recovered information value in response to result R. Steps 104 and 106 are carried out with a comparator. This recovered information value is represented as $\hat{q}[n]$.

While receiver designs have been described for both a continuous data sequence and that of a bi-valued data sequence, other receivers may be designed to accommodate other sequences of information to be communicated. For example, if more than two discrete values are being communicated, more than one threshold value will be used for comparison with the average value.

Many modifications and variations of the apparatus and method for implementing the present invention are possible in light of the above teachings. It is, therefore, to be understood that the foregoing embodiments are presented by way of example only and that, within the scope of the appended claims and equivalents thereto, the invention may be practiced otherwise than as specifically described.

What is claimed is:

1. A communication apparatus for communicating information over an arbitrary channel, comprising:
   means for embedding said information into a first sequence of numbers; and
   means for generating from said first sequence, a transmitted waveform having a, selected number of different frequency bands of differing bandwidths, each of said frequency bands having said information repeated therein at a certain rate, wherein said rate is directly proportional to the bandwidth of the frequency band.

2. A communication apparatus as set forth in claim 1 wherein said means for embedding includes means for iterating a discrete time routine for generating said first sequence of numbers, said routine being iterated a number of times equal to the number of different frequency bands.

3. A communication apparatus as set forth in claim 2 wherein said means for generating includes means for implementing a discrete to-continuous time processing routine upon said first sequence for generating said transmitted waveform.

4. A communication apparatus as set forth in claim 2 wherein said discrete time routine is represented by:

$$p^{[m]}[n] = \beta^i \sum_a \{h[n - 2a]p^{[m-1]}[a] + g[n - 2a]q[a]\},$$

and $p^{[0]}[n] = 0$, wherein:
   $p[m]_{[n]}$ for m = M represents said first sequence of numbers;
   q[n] represents the information to be communicated;
   h[n] and g[n] each represent a unit sample response;
   M, being a selected constant, represents said number of different frequency bands of differing bandwidths; and
   $\beta^i$, being a constant, controls the power level of the repeated information q[n] within each of said different frequency bands.

5. A communication apparatus as set forth in claim 3 wherein said means for generating includes an analog to-digital converter.

6. A communication apparatus as set forth in claim 1 further including a receiver for demodulating a received waveform, said receiver including:
 means for implementing a continuous-to-discrete time processing routine upon said received waveform for producing a second sequence of numbers;
 means for extracting said repeated information from said second sequence; and
 means for averaging said repeated information, thereby generating an average value which represents a recovered information value.

7. A communication apparatus as set forth in claim 6 wherein said receiver further includes:
 means for comparing said average value to a threshold value; and
 means for selecting a recovered information value in response to said comparison.

8. A communication apparatus as set forth in claim 6 wherein said means for averaging is designed to implement an averaging routine represented by:

$$\hat{q}[n] = \frac{1}{K + (1/\sigma_{x/z}^2)} \sum_{m=M_L}^{M_u} \beta^{m/2} \sum_{d=0}^{2^{m-M_L}-1} r_{n+dL}^m$$

wherein:
 $\hat{q}[n]$ represents said recovered information value;
 K represents the number of times said information is repeated in the received signal;
 $M_L$ represents the lowest frequency band received;
 $M_u$ represents the highest frequency band received;
 $\beta$ controls the power associated with each frequency band;
 $\sigma_{x/z}^2$ represents the signal-to-noise ratio of the received signal; and
 $r_n^m$ represents a portion of said information.

9. A communication apparatus for communicating information over an arbitrary channel, comprising
 means for receiving a self-similar waveform having a selected number of different frequency bands of different bandwidths, each of the frequency bands having the information repeated therein at a certain rate, the rate being directly proportional to the bandwidth of the frequency band;
 means for implementing a continuous-to-discrete time processing routine upon said received waveform for producing a sequence of numbers;
 means for extracting said repeated information from said sequence; and
 means for averaging said repeated information, thereby generating an average value which represents a recovered information value.

10. A communication apparatus as set forth in claim 9 further including:
 means for comparing said average value to a threshold value; and
 means for selecting a recovered information value in response to said comparison.

11. A communication apparatus as set forth in claim 9 wherein said means for averaging is designed to implement an averaging routine represented by:

$$\hat{q}[n] = \frac{1}{K + (1/\sigma_{x/z}^2)} \sum_{m=M_L}^{M_u} \beta^{m/2} \sum_{d=0}^{2^{m-M_L}-1} r_{n+dL}^m$$

wherein:
 $\hat{q}[n]$ represents said recovered information value;
 K represents the number of times said information is repeated in the received signal;
 $M_L$ represents the lowest frequency band received;
 $M_u$ represents the highest frequency band received;
 $\beta$ controls the power associated with each frequency band;
 $\sigma_{x/z}^2$ represents the signal-to-noise ratio of the received signal; and
 $r_n^m$ represents a portion of said information.

12. A method for communicating information over an arbitrary channel, comprising the steps of:
 embedding said information into a first sequence of multiple numbers; and
 generating from said first sequence of multiple numbers a waveform having a selected number of different frequency bands of differing bandwidths, each of said frequency bands having said information repeated therein at a certain rate, said rate being directly proportional to the bandwidth of said frequency band.

13. A method for communicating information as set forth in claim 12 further including the step of:
 transmitting said waveform over said channel.

14. A method for communicating information as set forth in claim 13 further including the steps of:
 receiving said transmitted waveform; and demodulating said received waveform.

15. A method for communicating information as set forth in claim 12 wherein the step of embedding said information includes the step of iterating a discrete time routine a number of times equal to the number of different frequency bands.

16. A method for communicating information as set forth in claim 15 wherein the step of generating said waveform includes the step of implementing a discrete-to-continuous time processing routine upon said first sequence of multiple numbers.

17. A method for communicating information as set forth in claim 14 wherein the step of demodulating said received waveform includes the steps of:
 producing a second sequence of multiple numbers;
 extracting said repeated information from said second sequence; and
 averaging said repeated information thereby generating an average value which represents a recovered information value.

18. A method for communicating information as set forth in claim 17 wherein the step of demodulating said received waveform further includes the steps of:
 comparing said average value to a threshold value; and
 selecting a recovered information value in response thereto.

19. A method for communicating information over an arbitrary channel, comprising the steps of:
 receiving a self-similar waveform having a selected number of different frequency bands of differing bandwidths, each of said frequency bands having said information repeated therein at a certain rate, said rate being directly proportional to the bandwidth of the frequency band;
 producing from said received waveform a sequence of multiple numbers;
 extracting the repeated information from said sequence; and
 averaging said repeated information thereby generating an average value which represents a recovered information value.

20. A method for communicating information as set forth in claim 19 further including the steps of:
comparing said average value to a threshold value; and
selecting a recovered information value in response thereto.

21. A communication apparatus for communicating information over an arbitrary channel, comprising:
a first processor receiving the information and embedding the information into a first sequence of numbers; and
a second processor, coupled to the first processor and receiving the first sequence of numbers therefrom, and generating, from the first sequence of numbers, a transmission waveform having a selected number of different frequency bands of differing bandwidths, each of the frequency bands having the information repeated therein at a certain rate, wherein the rate within each frequency band is proportional to the bandwidth of that frequency band.

22. A communication apparatus for communicating information over an arbitrary channel, comprising:
a first processor receiving a self-similar waveform having a selected number of different frequency bands of different bandwidths, each of the frequency bands having the information repeated therein at a certain rate, the rate being directly proportional to the bandwidth of the frequency band, and producing, from the received waveform, a sequence of numbers;
a second processor, coupled to the first processor, receiving the sequence of numbers and extracting therefrom the repeated information; and
a third processor, coupled to the second processor, receiving the repeated information, and averaging the repeated information, thereby generating an average value which represents a recovered information value.

* * * * *

UNITED STATES PATENT AND TRADEMARK OFFICE
CERTIFICATE OF CORRECTION

PATENT NO. : 5,285,478
DATED : February 8, 1994
INVENTOR(S) : Wornell et al.

It is certified that error appears in the above-indentified patent and that said Letters Patent is hereby corrected as shown below:

In the Abstract, line 16, please change "point to point" to --point-to-point--.

On column 1, line 61, change "r(t)to" to --r(t) to--.
On column 2, line 22, change "point-to point" to --point-to-point--.
On column 2, line 59, change "packet switching" to --packet-switching--.

On column 3, lines 33-34, please change "time warped" to --time-warped--.

On column 5, line 42, please change "time frequency" to --time-frequency--.

On column 6, line 31, please change "point to point" to --point-to-point--.

On column 6, lines 38-39, please change "Synthesis, Analysis and Processing of Fractal Signals" to --"*Synthesis, Analysis and Processing of Fractal Signals*"--.

UNITED STATES PATENT AND TRADEMARK OFFICE
CERTIFICATE OF CORRECTION

PATENT NO. : 5,285,478
DATED : February 8, 1994
INVENTOR(S) : Wornell et al.

It is certified that error appears in the above-indentified patent and that said Letters Patent is hereby corrected as shown below:

On column 7, line 18, please change

"$p^{[i+1]}[n] = \beta^{1/2}\sum_a \{h[n-2a]p^{[i]}[a]+g(n-2a]q[a\}.$" to

--$p^{[i+1]}[n] = \beta^{1/2}\sum_a \{h[n-2a]p^{[i]}[a]+g[n-2a]q[a]\}.$--.

On column 7, line 31, please change "$q*[n]$" to --$q_*[n]$--.

On column 7, line 37, please change "$q*[n]$" to --$q_*[n]$--.

On column 8, line 3, please change "Discrete to continuous" to --Discrete-to-continuous--.

On column 8, line 7, please change "digital to analog" to --digital-to-analog--.

On column 8, line 11, please change "digital to analog" to --digital-to-analog--.

UNITED STATES PATENT AND TRADEMARK OFFICE
CERTIFICATE OF CORRECTION

PATENT NO. : 5,285,478
DATED : February 8, 1994
INVENTOR(S) : Wornell et al.

It is certified that error appears in the above-indentified patent and that said Letters Patent is hereby corrected as shown below:

On column 8, line 13, please change "digital to analog" to --digital-to-analog--.

On column 8, line 47, please change "time bandwidth" to --time-bandwidth--.

On column 9, line 16, please change "rate bandwidth" to --rate-bandwidth--.

On column 9, line 48, please change "time bandwith" to --time-bandwidth--.

On column 10, line 36, please change "time bandwith" to --time-bandwidth--.

UNITED STATES PATENT AND TRADEMARK OFFICE
CERTIFICATE OF CORRECTION

PATENT NO. : 5,285,478
DATED : February 8, 1994
INVENTOR(S) : Wornell et al.

It is certified that error appears in the above-indentified patent and that said Letters Patent is hereby corrected as shown below:

On column 11, line 13, please change "pre filter" to --pre-filter--.

On column 11, line 24 please change "$r^m n$. These values $r^m n$" to --$r^m_n$. These values $r^m_n$--.

On column 11, line 32, please change "cut off" to --cut-off--.

UNITED STATES PATENT AND TRADEMARK OFFICE
CERTIFICATE OF CORRECTION

PATENT NO. : 5,285,478
DATED : February 8, 1994
INVENTOR(S) : Wornell et al.

It is certified that error appears in the above-indentified patent and that said Letters Patent is hereby corrected as shown below:

On column 11, line 36, please change "$r^m n$" to --$r^m_n$--.

On column 11, line 43, please change "$r^m n$" to --$r^m_n$--.

On column 11, line 49, please change "$r_n^{Mu}$" to --$r_n^{Mu}$--.

On column 11, line 50, please change "$r_n^{Mu-1}$" to --$r_n^{Mu-1}$--.

UNITED STATES PATENT AND TRADEMARK OFFICE
CERTIFICATE OF CORRECTION

PATENT NO. : 5,285,478
DATED : February 8, 1994
INVENTOR(S) : Wornell et al.

It is certified that error appears in the above-indentified patent and that said Letters Patent is hereby corrected as shown below:

On column 11, line 54, please change "$r_n^ML$" to --$r_n^{ML}$--.

On column 11, line 65, please change "$r_n^{Mu}$" to --$r_n^{Mu}$--.

On column 12, line 3, please change "q[-n]" to --g[-n]--

On column 12, line 8, please change "$r_n^m$" to --$r_n^m$--.

UNITED STATES PATENT AND TRADEMARK OFFICE
CERTIFICATE OF CORRECTION

PATENT NO. : 5,285,478   Page 7 of 13
DATED : February 8, 1994
INVENTOR(S) : Wornell et al.

It is certified that error appears in the above-indentified patent and that said Letters Patent is hereby corrected as shown below:

On column 12, line 17, please change $$\text{``} \hat{q}[n] = \frac{1}{K+(1/\sigma^2_{x/z})} \sum_{m=M_L}^{M_u} \beta^{m/2} \sum_{d=0}^{2^{m-M_L}-1} r^m_{n+dL} \text{'' to}$$

$$-- \hat{q}[n] = \frac{1}{K+(1/\sigma^2_{x/z})} \sum_{m=M_L}^{M_u} \beta^{m/2} \sum_{d=0}^{2^{m-M_L}-1} r^m_{n+dL} --.$$

On column 12, line 27, please change "$r_n m$" to -- $r^m_n$ --.

UNITED STATES PATENT AND TRADEMARK OFFICE
CERTIFICATE OF CORRECTION

PATENT NO. : 5,285,478
DATED : February 8, 1994
INVENTOR(S) : Wornell et al.

It is certified that error appears in the above-indentified patent and that said Letters Patent is hereby corrected as shown below:

On column 12, line 31, please change "$\sigma_{x/z}2$" to -- $\sigma^2_{x/z}$ --.

On column 12, line 31, please change "$r_n m$" to -- $r^m_n$ --.

On column 12, line 64, please change "$\sigma_{x/z}2$" to -- $\sigma^2_{x/z}$ --.

On column 13, line 50, please change "pre filter" to --pre-filter--.

On column 13, line 57, please change "$r_n m$" to -- $r^m_n$ --.

UNITED STATES PATENT AND TRADEMARK OFFICE
CERTIFICATE OF CORRECTION

PATENT NO. : 5,285,478

DATED : February 8, 1994

INVENTOR(S) : Wornell et al.

It is certified that error appears in the above-indentified patent and that said Letters Patent is hereby corrected as shown below:

On column 13, line 59, please change "$r_n m$" to -- $r_n^m$ --.

On column 13, line 63, please change "$r_n m$" to -- $r_n^m$ --.

On column 14, line 9, please change " $\dfrac{\sqrt{E}}{\sigma^2_z}$ " to -- $\dfrac{\sqrt{E}}{\sigma^2_z}$ --.

UNITED STATES PATENT AND TRADEMARK OFFICE
CERTIFICATE OF CORRECTION

PATENT NO. : 5,285,478
DATED : February 8, 1994
INVENTOR(S) : Wornell et al.

It is certified that error appears in the above-indentified patent and that said Letters Patent is hereby corrected as shown below:

On column 14, line 37, please change

"$Q(x) = \frac{1}{\sqrt{2\pi}} \int_x^\infty e^{-v^2/2} \, dv$" to

-- $Q(x) = \frac{1}{\sqrt{2\pi}} \int_x^\infty e^{-v^2/2} \, dv$ --.

On column 15, line 48 please change "digital to-analog" to --digital-to-analog--.

On column 15, line 57, please change "$r_n m$" to --$r_n^m$--.

On column 15, line 61, please change "$r_n m$" to --$r_n^m$--.

UNITED STATES PATENT AND TRADEMARK OFFICE
CERTIFICATE OF CORRECTION

PATENT NO. : 5,285,478
DATED : February 8, 1994
INVENTOR(S) : Wornell et al.

It is certified that error appears in the above-indentified patent and that said Letters Patent is hereby corrected as shown below:

On column 16, line 2, please change "$r_n m$" to -- $r_n^m$ --.

Column 16,
In claim 3, line 3, please change "discrete to-continuous" to --discrete-to-continuous--.

In claim 4, line 6, please change "$p[m]_{[n]}$" to --$p^{[m]}[n]$--.

In claim 5, line 2, please change "analog to-digital" to --analog-to-digital--.

UNITED STATES PATENT AND TRADEMARK OFFICE
CERTIFICATE OF CORRECTION

PATENT NO. : 5,285,478
DATED : February 8, 1994
INVENTOR(S) : Wornell et al.

It is certified that error appears in the above-indentified patent and that said Letters Patent is hereby corrected as shown below:

Column 17,
In claim 8, line 4, please change $$"\hat{\Lambda}_q[n] = \frac{1}{K+(1/\sigma^2_{x/z})} \sum_{m=M_L}^{M_u} \beta^{m/2} \sum_{d=0}^{2^{m-M_L}-1} r^m_{n+dL}"$$

to $$--\hat{\Lambda}_q[n] = \frac{1}{K+(1/\sigma^2_{x/z})} \sum_{m=M_L}^{M_u} \beta^{m/2} \sum_{d=0}^{2^{m-M_L}-1} r^m_{n+dL}--.$$

In claim 8, line 13, please change "$\sigma_{x/z}2$" to --$\sigma^2_{x/z}$--.

In claim 8, line 15, please change "$r_n m$" to --$r^m_n$--.

UNITED STATES PATENT AND TRADEMARK OFFICE
CERTIFICATE OF CORRECTION

PATENT NO. : 5,285,478
DATED : February 8, 1994
INVENTOR(S) : Wornell et al.

It is certified that error appears in the above-indentified patent and that said Letters Patent is hereby corrected as shown below:

Column 17, line 65, claim 11, please change $$\text{"}\hat{q}[n] = \frac{1}{K+(1/\sigma^2_{x/z})} \cdot \sum_{m=M_L}^{M_u} \beta^{m/2} \sum_{d=0}^{2^{m-M_L}-1} r^m_{n+dL}\text{"  to}$$

$$\text{--}\hat{q}[n] = \frac{1}{K+(1/\sigma^2_{x/z})} \cdot \sum_{m=M_L}^{M_u} \beta^{m/2} \sum_{d=0}^{2^{m-M_L}-1} r^m_{n+dL}\text{--.}$$

Column 18, line 7, claim 11, please change
"$\sigma{x/z}^2$" to --$\sigma^2_{x/z}$--.

Column 18, line 9, claim 11, please change
"$r_n^m$" to --$r^m_n$--.

Signed and Sealed this

Twenty-seventh Day of September, 1994

Attest:

BRUCE LEHMAN

Attesting Officer   Commissioner of Patents and Trademarks